UNITED STATES PATENT OFFICE.

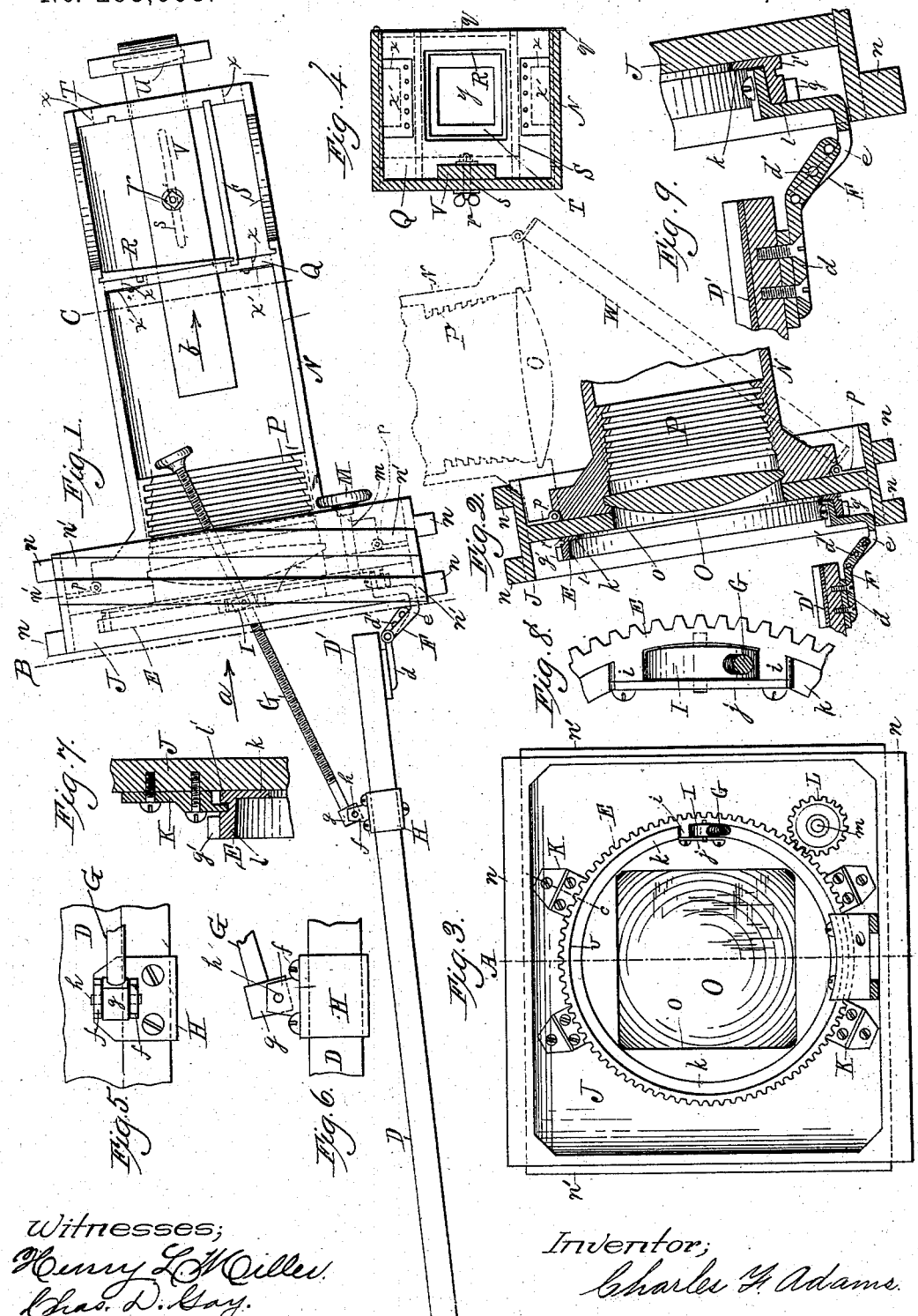

CHARLES F. ADAMS, OF WORCESTER, MASSACHUSETTS.

SOLAR CAMERA.

SPECIFICATION forming part of Letters Patent No. 295,608, dated March 25, 1884.

Application filed November 16, 1883. (No model.)

*To all whom it may concern:*

Be it known that I, CHARLES F. ADAMS, of the city and county of Worcester, and State of Massachusetts, have invented certain new and useful Improvements in Solar Cameras; and I do hereby declare that the following is a full, clear, and exact description of the same, reference being had to the accompanying drawings, forming a part of this specification, and in which—

Figure 1 represents a side view of my improved solar camera, which will hereinafter be fully described. Fig. 2 represents a vertical central section taken at the point indicated by line A, Fig. 3, the dotted lines showing the camera-box in a vertical position, with an additional reflecting-mirror, for purposes to be hereinafter fully stated. Fig. 3 represents a vertical elevation taken on line B, Fig. 1, looking in the direction of arrow $a$, same figure, showing the position of the adjusting gear-wheel and the condensing-lens. Fig. 4 represents a cross-section taken on line C, Fig. 1, looking in the direction of arrow $b$, same figure. Figs. 5, 6, 7, 8, and 9 represent enlarged views of different parts of my improved solar camera, to be hereinafter fully described, Fig. 7 being a section on line $c$, Fig. 3.

My invention relates to solar cameras which are used to illuminate objects by the light of the sun concentrated upon them, so that a highly-magnified image of the object may be thrown upon a wall or screen in a darkened room by means of a magnifying lens or lenses; and my invention consists in certain novel features of construction of certain parts of a solar camera, to be hereinafter fully described and claimed.

To enable those skilled in the art to which my invention belongs to make and use the same, I will proceed to describe it more in detail.

In the drawings, D represents a reflecting-mirror in a suitable frame, which is exposed to the sun to reflect its light through a condensing-lens and the camera. The mirror D is attached to the adjusting revolving gear-wheel E at one end by means of a bent adjustable hinge, F, constructed in a peculiar manner, so that the part $d$, fastened to the mirror, having holes $d'$ therein, or, if preferred, a slot, is made adjustable in the part $e$, fastened to the adjusting gear-wheel E, and the end D' of the mirror D may be raised or lowered, occupying different positions relatively to the adjusting-wheel E. By this construction and arrangement a much shorter reflecting-mirror can be used, the angle of the mirror being varied by means of the adjustable hinge F. The reflecting-mirror D is raised or lowered, or tipped into different positions relatively to the adjusting gear-wheel E, by means of a threaded screw, G, attached to one side of said mirror by means of a bent hook-piece, H, which fits onto the frame of the mirror, and is held in place thereon by screws or other suitable means. Said piece H has two projections, $f$, on its top surface, (see Figs. 5 and 6,) between which is pivoted a cube-piece, $g$, the end of the tipping-screw G extending into and turning in said part $g$, being held therein by means of the pin $h$ in the usual manner, so as to allow said screw G to turn in said cube-piece $g$, and at the same time prevent it from coming out of said part $g$. The tipping-screw G turns in an elongated nut, I, pivoted to the adjusting gear-wheel E, said wheel being provided with bosses or projections $i$, to the ends of which the flat piece $j$ is attached, by means of which the nut I is pivoted, as fully shown in Fig. 8 of the drawings. A portion of the flange $k$, between the projections $i$ on the adjusting-wheel E, is cut away to allow of the tipping-screw G passing through, and also to allow of a sufficient tipping motion of the screw G at this point in raising and lowering the reflecting-mirror D, (see Fig. 1, dotted lines,) and the nut I, through which the screw G turns, is made elongated, so as to cover up the opening in the flange $k$, and thus prevent any light from passing through at this point and being visible upon the wall or screen, and thus detract from the perfectness of the picture.

The adjusting gear-wheel E, before mentioned, to which the reflecting-mirror D is attached by the adjustable hinge F, is constructed so as to be turned or revolved on the stationary part or frame J, for the purpose of adjusting the reflecting-mirror, and moving it into the proper positions for reflecting the light of the sun. Said adjusting-wheel E has teeth $g'$ upon the outer half, $l$, of its rim, the other half, $l'$, having a groove cut therein, into which the parts K, fastened to frame J, project to hold said gear in its proper position against said frame and allow it to be revolved thereon. (See Fig. 7.) The adjusting-gear E is made with a flange, $k$, thereon, which projects over the slot or opening made in the frame J, for the purpose of allowing of the free motion of the tipping-screw G therein as the adjusting-gear E is revolved around on frame J by means of the small gear L, which meshes therewith, and which is fastened to the end of a short rod, $m$, which has its bearings or turns in the frame part J, and is provided at its other end with a small wheel or knob, M, by which it is turned. The object of the flange $k$ on adjusting-gear E is to prevent the light reflected from the mirror D and other light from passing through the slot or opening cut in the frame part J for the tipping-screw G, and being visible on the walls or screen. The frame part J has upon two of its opposite surfaces or edges cleats or narrow strips $n$, for the purpose of holding the frame J and the other parts of the camera attached thereto firmly between the opened sash and the sill of the window when the camera is in use. There are also upon the other two edges of the frame part J cleats or narrow strips $n'$, to allow of the frame being fitted to one side of the window-frame, and a darkening-shutter fitted to the other side of the frame, so that all outside light, except that reflected through the condensing-lens and camera, may be excluded from the room.

To the frame part J, which has a square opening, $o$, in its central part, for the light to pass through, is attached by means of hinges $p$, as shown in the drawings, or in any other suitable manner, an oblong camera-box, N, having one side thereof open, for purposes to be hereinafter stated.

The condensing-lens O is fastened into the end of camera-box N in any suitable manner, and entirely covers the opening $o$ in the frame part J. Upon the inner faces of the sides of said box N, next to the condensing-lens O, there are shadow grooves and ridges P, for the purpose of cutting off all superfluous light coming through the condensing-lens O.

In about the middle of the camera-box N there is fastened a plate or diaphragm, Q, having a square opening therein, through which the light passes. Against the outer face of said diaphragm Q a wedge-shaped piece, R, made of wood, and of the same width as the depth of the box N from the back to the front, and of slight thickness, and having an opening therein a little smaller than the opening in the diaphragm Q, is fitted to slide in grooves in the upper side of the box N and in the adjustable shelf S. The object of the wedge-shaped plate R, against which the picture or object to be magnified is placed, is to make the lines of the picture perpendicular upon the wall or screen when the camera is not in a horizontal position.

In practice the solar camera is used in the lower part of a window, and the screen upon which the picture is thrown is usually vertical and at a higher level than the lower part of the window, so that the rays of the light have to be inclined upward. The picture on the screen, which would be broadened at the top, owing to its greater distance from the camera and the spreading of the rays, is by the use of the wedge-shaped piece R made to form a square and the lines which are perpendicular on the photographic slide, being inclined by the wedge shape of the piece R, are made perpendicular on the screen. If the wedge-shaped piece R is not used, the lines of the picture on the screen will not be true and straight when the camera-box N is not in a horizontal position, the top part of the picture will be broader than the bottom part, and the side lines of the picture will not be perpendicular, but will converge slightly toward the bottom, and hence to produce on the screen the same outline that the picture has on the photographic slide, the wedge-shaped piece R is used. Said piece R must have sufficient thickness at its upper end to compensate for the elevation of the box N above the horizontal. The wedge-shaped piece R may be withdrawn from the box N and its use dispensed with, if desired.

The shelf S, upon which the object to be magnified is placed, is adjustable by means of slots cut in the diaphragm Q and the end T of the box N, as shown in the drawings. The open side of box N, as far as the diaphragm Q, is provided with a piece of enameled cloth or other suitable material, (see $q$ Fig. 4,) fastened to the upper side of the box N, which, when the camera is in use, is dropped down over the open side, to shut out all outside light. The object of having one side of the box N open is that by means of this opening an alum-tank or any object to be experimented with may be placed within said box, and that the lenses or other parts may be easily cleaned. That part of the box N beyond the diaphragm Q has its upper and lower sides cut away, leaving only one side, so that objects larger than could be contained within the box itself can be experimented with.

The magnifying-lens U, in a suitable frame, is attached at right angles in any suitable way to a flat piece or strip, V, which is held in position, and slides in and out in slots or openings $x$, cut in the diaphragm Q, and in the end T of box N, said end having also a square opening, $y$, in the centre thereof, for the light to pass through to the magnifying-lens U. The end T of the camera-box N serves as an additional diaphragm to cut off all superfluous and injurious light from the screen or wall. The diaphragm Q is provided with pieces of leather, $x'$, or some other suitable material, to fit over the slots $x$ in the top and bottom part of said diaphragm Q when not in use. When the magnifying-lens U is properly adjusted, by means of strip V sliding in and out, as before mentioned, it is held firmly in place by means of a thumb-screw, r, passing through a slot, s, in the back side of box N, and through strip V, (see Figs. 1 and 4,) or by any other suitable mechanism. In lieu of the single lens U, a combination of lenses may be used, if desired.

In Figs. 1 and 2 of the drawings the box N is represented as fastened to the frame J by means of hinges p. The object of this is that when it is desired to use the camera for a vertical camera, for any reason, the box N and all the parts attached thereto may be raised into a vertical position, as shown by dotted lines, Fig. 2, the pin of the lower hinge p being withdrawn, and a second reflecting-mirror, W, being fastened to frame J and to the bottom of box N, in the position shown by dotted lines, by hinges or in any other suitable manner, for the purpose of reflecting the light through the condensing-lens O, and at the same time holding the camera or box N in its vertical position.

If it is not intended to ever use the camera as a vertical camera, the box part N may be attached to the frame J permanently by means of screws, or in any other suitable manner.

The camera, as shown in Fig. 1, is a right-hand instrument; but it is so constructed that it may be very quickly and easily changed into a left-hand instrument by taking off the adjustable hinge F from the gear-wheel E and attaching it again thereto at a point, v, Fig. 3, directly opposite where it was before, and also taking off the bent hook-piece H from one side of the mirror D and attaching it in the same position upon the opposite side. After this has been done, the mirror D will be at the top of the frame J instead of at the bottom, as shown in Fig. 1, the position of the threaded tipping-screw G and other parts remaining substantially the same as shown in Fig. 1, except the positions of the wedge-piece R and adjustable shelf S are reversed. Now, by reversing the camera it may be used for a left-hand instrument.

It will be readily seen that it is a great advantage to be able to use the same camera, by simply altering the position of the attachments of the reflecting-mirror, either for a right-hand or a left-hand instrument.

Having described my improvements in solar cameras, what I claim therein as new and of my invention, and desire to secure by Letters Patent, is—

1. In a solar camera, the combination, with the reflecting-mirror D and the adjusting-gear of the camera, of an adjustable hinge for attaching said mirror to said adjusting-gear, substantially as shown and described.

2. The bent hook-piece H, having projections f on its top part, in combination with and attached to one side of the reflecting-mirror D, in connection with cube-piece g and screw G, to raise or lower said mirror D, substantially as shown and described.

3. In a solar camera, the combination, with an adjusting-gear and a screw for tipping the mirror D, of the cube-piece g, attached to hook-piece H on the reflecting-mirror, substantially as shown and described.

4. In a solar camera, the combination, with an adjusting-gear, of an elongated nut, I, pivoted thereto, and the adjusting mirror-screw G, substantially as shown, and for the purposes stated.

5. The combination, with the frame part J, having a slot for the mirror-tipping screw G, of the adjusting-gear E, having a flange, k, substantially as shown, and for the purposes stated.

6. The combination, with the frame part J, of camera-box N, provided with shadow grooves and ridges P, and having a diaphragm or plate, Q, therein, substantially as shown and described.

7. The combination, with the camera-box N, of a wedge-shaped piece, R, used to make the lines of the picture perpendicular on the screen, and adjustable shelf S, substantially as shown, and for the purposes stated.

8. The combination, with the reflecting-mirror D, adjusting-gear E, tipping mirror-screw G, and frame part J, of the box part N and parts attached thereto, hinged or pivoted to said frame part J, and reflecting-mirror W, all to be used for a vertical camera, substantially as shown and described.

9. The combination, with the frame part J and the reflecting-mirror D, hinged to the adjusting-gear E and tipping mirror-screw G, of the camera-box N and parts attached thereto, all so constructed and arranged that the instrument may be used either as a right-hand or a left-hand camera, substantially as shown and described.

CHARLES F. ADAMS.

Witnesses:
 JOHN C. DEWEY,
 HENRY L. MILLER.